(12) United States Patent
Aggarwal et al.

(10) Patent No.: US 10,152,076 B2
(45) Date of Patent: Dec. 11, 2018

(54) SYSTEM AND METHOD FOR AGGREGATION OF CONTROLLABLE DISTRIBUTED ENERGY ASSETS

(71) Applicant: SIEMENS AKTIENGESELLSCHAFT, München (DE)

(72) Inventors: Aditya Aggarwal, Fredericton (CA); Erich Fuchs, Mödling (AT); Pierre Mullin, Fredericton (CA)

(73) Assignee: SIEMENS AKTIENGESELLSCHAFT, München (DE)

( * ) Notice: Subject to any disclaimer, the term of this patent is extended or adjusted under 35 U.S.C. 154(b) by 49 days.

(21) Appl. No.: 15/279,960

(22) Filed: Sep. 29, 2016

(65) Prior Publication Data

US 2018/0088616 A1 Mar. 29, 2018

(51) Int. Cl.
G05F 1/66 (2006.01)
G06Q 50/06 (2012.01)
(Continued)

(52) U.S. Cl.
CPC .............. *G05F 1/66* (2013.01); *G06Q 50/06* (2013.01); *H02J 3/381* (2013.01); *H02J 3/46* (2013.01);
(Continued)

(58) Field of Classification Search
CPC .. G05B 2219/40458; G05F 1/66; H02J 3/381; H02J 3/46; H02J 2003/003
See application file for complete search history.

(56) References Cited

U.S. PATENT DOCUMENTS

| 2010/0076613 A1* | 3/2010 | Imes | G06Q 50/06 |
| | | | 700/287 |
| 2011/0137591 A1* | 6/2011 | Ishibashi | G06Q 10/04 |
| | | | 702/60 |

(Continued)

FOREIGN PATENT DOCUMENTS

WO    2014143908 A1    9/2014

OTHER PUBLICATIONS

Lombardi P. et al; "Optimal Operation of a Virtual Power Plant"; Power&Energy Society General Meeting, 2009, PES '09, IEEE, Piscataway, NJ; pp. 1-6; ISBN: 978-1-4244-4241-6; XP031538978 / Jul. 26, 2009.

*Primary Examiner* — Jennifer L Norton (57) ABSTRACT

A system and method is provided that facilitates aggregation of a plurality of controllable distributed energy resources (DERs). A processor may be configured to determine DER forecasts including non-influenced power profile forecasts for a plurality of DERs that include different types of load assets that consume power, for when the DERs are not influenced via dispatches from the system, based at least in part on different physics characteristics associated with the different types of the DERs. The processor may also determine a combined reserve capacity forecast for aggregated DERs including both power assets that output power and the different types of load assets, based at least in part on an aggregation of the non-influenced power profile forecasts. In addition, the processor may control at least some of the plurality of DERs based at least in part on the combined reserve capacity forecast. Also in some examples, the processor may output a bid to an energy trading market system for a reserve capacity request for the aggregated DERs as an individual asset that corresponds to the determined combined reserve capacity forecast.

17 Claims, 5 Drawing Sheets

(51) Int. Cl.
 *H02J 3/00* (2006.01)
 *H02J 3/38* (2006.01)
 *H02J 3/46* (2006.01)

(52) U.S. Cl.
 CPC ............ *G05B 2219/40458* (2013.01); *H02J 2003/003* (2013.01)

(56) References Cited

U.S. PATENT DOCUMENTS

| | | | | |
|---|---|---|---|---|
| 2012/0065792 | A1* | 3/2012 | Yonezawa | H02J 3/14 700/291 |
| 2014/0277808 | A1 | 9/2014 | Irisarri et al. | |
| 2015/0127179 | A1* | 5/2015 | Binding | H02J 3/28 700/291 |
| 2015/0364952 | A1* | 12/2015 | Maruhashi | H02J 3/14 307/18 |
| 2016/0011577 | A1* | 1/2016 | Schwarz | G05B 15/02 700/295 |
| 2018/0005325 | A1* | 1/2018 | Miyamoto | G06Q 50/06 |
| 2018/0088545 | A1* | 3/2018 | Fuchs | G05B 15/02 |

\* cited by examiner

SYSTEM AND METHOD FOR AGGREGATION OF CONTROLLABLE DISTRIBUTED ENERGY ASSETS

TECHNICAL FIELD

The present disclosure is directed, in general, to disturbed energy resources.

BACKGROUND

Distributed energy resources may include renewable energy generation assets that can be aggregated by systems to provide power. Such systems may benefit from improvements.

SUMMARY

Variously disclosed embodiments include data processing systems and methods that may be used to facilitate aggregation of controllable distributed energy resources (DERs) as a single manageable flexible load class for use in a virtual power plant (VPP).

In one example, a system for aggregation of a plurality of DERs may comprise at least one processor configured to determine DER forecasts including non-influenced power profile forecasts for a plurality of DERs that include different types of load assets that consume power, for when the DERs are not influenced via dispatches from the system, based at least in part on different physics characteristics associated with the different types of the DERs. The at least one processor may also be configured to determine a combined reserve capacity forecast for aggregated DERs including both power assets that output power and the different types of load assets, based at least in part on an aggregation of the non-influenced power profile forecasts. In addition, the at least one processor may be configured to control at least some of the plurality of DERs based at least in part on the combined reserve capacity forecast.

In another example, a method for aggregation of a plurality DERs may comprise through operation of at least one processor several acts. Such acts may include determining DER forecasts including non-influenced power profile forecasts for a plurality of DERs that include different types of load assets that consume power, for when the DERs are not influenced via dispatches from the system, based at least in part on different physics characteristics associated with the different types of load assets. Such acts may also include determining a combined reserve capacity forecast for aggregated DERs including both power assets that output power and the different types of load assets, based at least in part on an aggregation of the non-influenced power profile forecasts. In addition, the acts may include controlling at least some of the plurality of DERs based at least in part on the combined reserve capacity forecast.

A further example may include a non-transitory computer readable medium encoded with executable instructions (such as a software component on a storage device) that when executed, causes at least one processor to carry out this described method.

Another example may include an apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods that facilitate aggregation and management of a plurality of controllable distributed energy resources will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
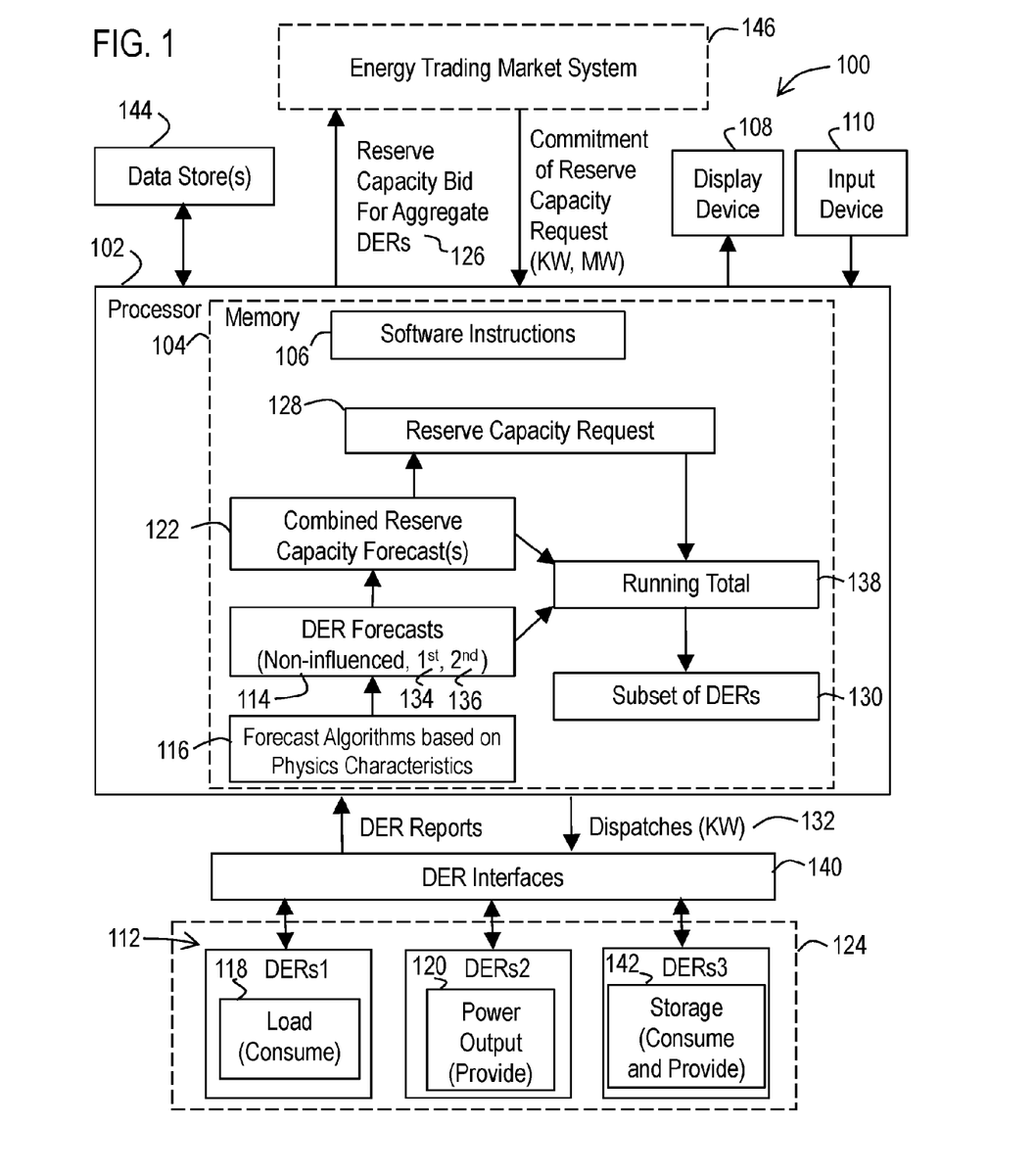
FIG. 1 illustrates a functional block diagram of an example system that facilitates aggregation of a plurality of controllable distributed energy resources (DERs).

With reference to FIG. 1, an example data processing system 100 is illustrated that facilitates aggregation of controllable distributed energy resources (DERs). The system 100 may include at least one processor 102 that is configured to execute software instructions 106 (included in at least one application software component) from a memory 104 accessed by the processor. The software instructions may be configured (i.e., programmed) to cause the processor to carry out various acts and functions described herein. For example, the described software instructions 106 may be included in one or more components of an energy management software application that is configured to control and manage electrical power associated with a virtual power plant (VPP).

Examples of energy management software applications that may be adapted to carry out the features and functions described herein may include the Siemens Smart Grid Software solutions: Demand Response Management System (DRMS); and Decentralized Energy Management Suite (DEMS), produced by Siemens, AG, Smart Grid Division, of Germany. However, it should be appreciated that the systems and methods described herein may be used in other energy management systems, smart grid systems, virtual power plants, and/or any other type of system that manages electrical power production and loads.

The described data processing system 100 may include at least one display device 108 and at least one input device 110. The display device, for example, may include an LCD display screen, monitor, and/or a projector. The input devices, for example, may include a mouse, pointer, touch screen, touch pad, drawing tablet, track ball, buttons, keypad, keyboard, camera, motion sensing device that captures motion gestures, and/or any other type of input device capable of providing the inputs described herein. For example, the processor 102, memory 104, software instructions 106, display device 108, and input device 110, may be included as part of a data processing system corresponding to a PC, workstation, server, or any other type of computing system, or any combination thereof.

In an example embodiment, the described software instructions may enable (via a user interface) different types of DERs to be aggregated together to form an aggregated DER that is managed as an individual DER asset by one or more applications. A DER as defined herein as corresponding to a decentralized electrical grid-connected device that may generate electricity, consume electricity, or both, and which is controllable (i.e., its power output and/or power consumption can be influenced) via dispatches (i.e., messages) communicated from the described system. DERs may include load asset type DERs 118 that consume electrical power such as air conditioners, HVACs, baseboard heaters, building lighting systems, other controllable loads, or any combination thereof. DERs may also include power output asset type DERs 120 such as solar power panels, wind turbines, generators, other power generation assets that output power, or any combination thereof. Further DERs may also include storage asset type DERs 142 such as batteries that may both consume power (when charging) or output power (when discharging).

The described software instructions may be configured to carry out features described herein based on the type of the DER. DER type may be based on the physics characteristics associated with how the DER operates. For example, solar panels may correspond to a solar energy type of DER that shares the physics characteristic of producing electrical power responsive to sun light. Also for example, wind turbines may correspond to a wind energy type of DER that shares the physics characteristic of producing electrical power responsive to wind. In addition, HVACs may correspond to one or more further types of DERs that share the physics characteristics of consuming electrical power to cool or heat a building. Further, building lighting may correspond to another type of DER that shares the physics characteristic of consuming electrical power to provide light.

In example embodiments, the physics characteristics associated with the operation of a particular type of DER may be represented by one more forecast algorithms 116 usable to forecast how the particular type of device will output or consume power in the future. For example, a forecast algorithm for a solar energy type of DER may be capable of determining for one or more time periods and time intervals therein (e.g., each minute, hour, and/or day) in the future, how much electrical energy will be produced by DERS of this type based on forecasts associated with sunrises, sunsets, cloud cover, precipitation, solar irradiation and/or any other factor that effects the amount of sunlight a solar panel is expected to receive during such time periods.

Also, for example, a forecast algorithm for an HVAC type of DER may be capable of determining for one or more time periods and time intervals therein (e.g., each minute, hour, and/or day) in the future, how much electrical energy will be consumed by DERS of this type based on forecasts associated with outside temperate, humidity, work/school/holiday schedules, and/or any other factor that effects the amount of electrical power that may be consumed by HVACs.

Further, for the same type of DER, the described system may include two or more different types of forecast algorithms 116 capable of generating power output or consumption forecasts. Such different types of forecasting algorithms, which are based on the physics characteristics of particular types of DERs, may, for example, be pluggable software components that may be individual installed, uninstalled from the system to enable the types of forecast algorithms available to use by the system to be changed. Also, the described software instructions 106 may enable such different forecasting algorithms 116 (that are installed for the same type of DERS) to be individually selectable (e.g., via a user interface) for use by the software in generating forecasts for one or more groups of such types of DERs.

The described software instructions may also enable a user to select (via the user interface) which subset of DERs (from among a larger available set of DERs) to include in a groups of DERs that is associated (via a further selection with the user interface) with a particular forecasting algorithm. In example embodiments, such DERS may be controlled (i.e., influenced) to at least some extend by dispatches 132 from the system 100.

Dispatches, for example, may specify one or more target maximum and/or minimum amounts of power for which the DER should be configured to consume and/or output during a specified time period. Such dispatches may be communicated by the system 100 to one or more different types of DER interfaces 140 (e.g., networks/controllers) that are responsible for managing the operation of particular types of DERs. The described software instructions may be configured to communicate in the particular protocols and/or message formats for these different types of interfaces in order to influence the operation of the DERs and to receive status or other operational information from the DERS (e.g., on/off status, current power consumption and/or output levels). Such interfaces may communicate according to data communication specifications/protocols such as Multispeak, OpenADR, DNP3, IEC 61850, IEC 104, and/or any other type of communication interface that are usable to manage DERs.

In an example embodiment, the at least one processor 102 may be configured (e.g., via the software instructions 106 including the described different types of forecast algorithms 116) to determine non-influenced power profile forecasts 114 for a plurality of DERs for when the DERs are not influenced via dispatches 132 (i.e., messages) from the system.

For example, a forecast for a non-influenced power load produced by a DER such as one or more HVAC systems, may correspond to a forecast of the amount of power that the HVAC system(s) will consume from an electrical grid, when no OpenADR signal has been communicated to limit when the HVAC system is permitted to operate to cool or heat a home/business. Also, for example, a forecast for non-influenced power output produced by a DER corresponding to one or more solar panels, may correspond to a forecast of the amount of power that the solar panels will generate, when no dispatch has been communicated to limit the amount of power provided by the solar panels to the electrical grid.

In another example, it should be appreciated that storage devices (such as a battery in an electrical vehicle or battery bank) may correspond to a controllable load (when charging form the electrical grid) or may correspond to a controllable power output (when configured to discharge into the electrical grid). A non-influenced forecast for such an asset may correspond to a forecast of the amount of power that the storage device will consume when charging.

In this described embodiment, the processor may be configured to determine different non-influenced forecasts for each different type of DER based on the different physics characteristics (i.e., via respective different forecast algorithms 116 for the respective different physics characters) associated with each of a plurality of different types of the DER. As discussed previously, such different types of DERs for which forecasts may be determined via different respective forecasts algorithms, may include one or more groups of different types of load assets 118 that consume power (e.g., HVAC, lighting, water heaters and/or other controllable devices); one or more groups of different types of power output assets 120 that generate power (e.g., solar panels, wind turbines); one or more groups of different types of storage device assets 142 (e.g., batteries); or any combination thereof. However, it should also be appreciated that in some embodiments non-influenced forecasts may be generated for load type assets, and not power output assets, depending on the type of power assert and its flexibility to be controlled via dispatches.

It should be appreciated that the fluctuation of energy production by renewable energy types of DER assets (such as solar and wind power DERs) may require the purchase of variable amounts of reserve capacity from the electrical grid (to compensate for dips in power generation by power output assets and for spikes in power consumption by load assets).

In this described example, the processor 102 may be configured to determine a combined reserve capacity forecast 122 for the aggregated DERs 124 based at least in part on an aggregation of the non-influenced power profile forecasts for the plurality of DERs. Such a combined reserve capacity forecast, for example, may indicate an amount of additional power (i.e., a reserve capacity request 128) that is needed to be purchased to cover the excess loads when the load assets are forecasted to consume more power than the power output assets that are included in aggregated DERS. In other words the combined reserve capacity forecast for a particular future time period may correspond to the amount of a summation of all of the forecasted amounts of non-influenced power loads for the load asset types of DERs that is greater than a summation of all of the forecasted amounts of non-influenced power outputs for power generation/output asset types of DERs for the particular time period.

The described system may be configured to generate and output data representative of a bid 126 for power to an energy trading market system 146. Such a bid may correspond to an offer to purchase the forecasted amount of power corresponding to the reserve capacity request 128 for the aggregated DERs. Also, such a bid may represent the aggregated DER as an individual load class (e.g., as a single DER from the perspective of the market system) that corresponds to the determined combined reserve capacity forecast 122. The described software instructions, for example, may be configured to access one or more different market systems 146 via an online web based interface, or other type of communication system. By way of such an interface, the software instructions 106 may cause the processor 102 to submit data corresponding to the bid and may also cause the processor 102 to receive confirmation that the bid has been accepted for the reserve capacity request 128 for a particular time period (e.g., one day in the future).

Examples of such energy trading market systems may include Markets Gateway provided by PJM of Audubon, Pa., which is a tool that allows members to submit information and obtain data needed to conduct business in the day-ahead, regulation and synchronized reserve markets. Another example of a market system includes the Energy Market Desk at NB power in New Brunswick, Canada. Also it should be understood that some energy trading market systems may be capable of facilitating all of the features described herein, whereas other energy trading market systems may only facilitate a subset of the features described herein.

It should also be appreciated that forecasts may become more accurate with respect to predicting a further need for reserve capacity, the closer the forecasts are made to the actual time the reserve capacity is needed. Thus, forecasts one day a head may be less accurate than a forecast made one hour or one minute a head of the actual time period the reserve capacity is needed. Thus, the reserve capacity request that was committed to via the market system bid and accepted one or more days in the future, may be low and or high compared to the reserve capacity that may actually be needed when the next day time frame arrives.

To avoid or minimize monetary costs associated with not meeting the agreed commitment for purchase of the agreed amount of the reserve capacity request during the requested time period, example embodiments of the system may be configured to carry out one or more optimizations for the operation of aggregated DERs closer to the actual time period (e.g., one day and/or minutes ahead of the actual time period) for which the reserve capacity request is needed by the aggregated DERs.

To carry out an optimization processes, the processor 102 may be configured (e.g., via the software instructions) to determine a more current combined reserve capacity forecast 122 for the aggregated DERs 124. In other words, the processor may be configured to update the previously described non-influenced power profile forecasts 114 for the plurality of DERs 112 for the time period of the reserve capacity request that are a day ahead and/or that are one or more minutes ahead of this time period. The processor may also aggregate such updated non-influenced power profile forecasts 114 as described previously to determine the updated combined reserve capacity forecast 122 that is a day ahead and/or one or more minutes before the time period of the reserve capacity request.

The processor may then control the aggregated DERs based on a comparison between the updated combined reserve capacity forecast and the committed reserve capacity request for the same time period. Such a comparison may result in a determination that the requested reserve capacity is either greater than or less than the updated reserve capacity forecast, and based thereon the processor may selectively generate and output dispatches to less than all of the DERs, in order to schedule the DERs to consume an actual amount of reserve capacity that more closely meets the commitment for the reserve capacity request during that time frame (compared to if the DERs are not influenced by the system during that time frame by sending dispatches).

To carry out this optimization functionality, the processor may also be configured to determine additional forecasts 134, 136 for the time period of the reserve capacity request. Such additional DER forecasts may include a respective first control limit power forecast 134 for the respective DER that contributes to increasing required reserve capacity by the aggregated DERs. Such additional DER forecasts may include a respective second control limit power forecast 136 for the respective DER that contributes to decreasing required reserve capacity by the aggregated DERs. Such first and second control limits may correspond to the forecasted maximum or minimum power consumption or output for the respective DER that is achieved by dispatches to each respective DER.

It should be understood that dispatches for load asset type DERs may cause the DER to either decrease consumption or increase consumption compared to when the DER is not influenced by a dispatch. Also, it should be understood that dispatches for power output or storage asset type DERs may cause the DER to either increase power output (such as via idling a wind turbine) or increase power output (such as via causing a battery to discharge) compared to when the DER is not influenced by a dispatch.

For example, with respect to loads asset type DERs 118, the first control limit power forecast for the respective DER that contributes to increasing required reserve capacity by the aggregated DERs may corresponds to a maximum possible power consumption forecast 134 by a respective load asset 118. Also with respect to load asset type DERs, the second control limit power forecast for the respective DER that contributes to decreasing required reserve capacity by the aggregated DERs may correspond to a minimum possible power consumption forecast 136 by a respective load asset 118.

Conversely, for power output types of DERs 120, the first control limit power forecast for the respective DER that contributes to increasing required reserve capacity by the aggregated DERs may corresponds to a minimum possible power generation forecast by a respective power output asset 120. Also with respect to power output asset type DERs, the second control limit power forecast for the respective DER that contributes to decreasing required reserve capacity by the aggregated DERs may correspond to a maximum possible power generation forecast by a respective power output asset 120.

Further, it should be appreciated that for storage types of DERs 120 (e.g., batteries), the first or second control limit power limits may correspond to minimum maximum loads and/or power outputs depending on the forecasted charge/discharge configuration of the storage device.

It should be understood that not all of the DERs of the plurality of DERs 112 may need to be influenced in order to sufficiently meet the target reserve capacity request for the time period. Thus, the optimization function may involve the processor selecting a subset of the DERs 130 that is less than the total number of the plurality of DERs 112 to send respective dispatches 132 to in order to meet the reserve capacity request 128.

In an example embodiment, such dispatches for the subset of DERs 130 may correspond to either the respective first control limit power forecast 134 for the respective DER or the respective second control limit power forecast 136 for the respective DER, based on whether the requested reserve capacity is either greater than or less than the updated reserve capacity forecast.

During this described optimization function, the processor may be configured to calculate a running total 138 of power consumption. When the reserve capacity request 128 is greater than the updated combined reserve capacity forecast 122, the processor may incrementally cycle through at least a portion of the plurality of DERs 112 included in the aggregated DERs 124 to adjust the calculated running total to reflect power consumption using a maximum possible power consumption forecast 134 for each respective DER, until the running total corresponds to the reserve capacity request 128. However, when the reserve capacity request 128 is less than the updated combined reserve capacity forecast 122, the processor may incrementally cycle through at least a portion of the plurality of DERs 112 included in the aggregated DERs 124 to adjust the calculated running total to reflect power consumption using a minimum possible power consumption forecast 136 for each respective DER, until the running total corresponds to the reserve capacity request. In this example a running total corresponds to the reserve capacity when it is within a predetermined threshold amount of power with respect to the reserve capacity.

In this example, the subset of DERs 130 corresponds to the DERs for which a maximum or minimum possible power consumption forecast was used to adjust the running total. Also the dispatches for the subset of DERs specify either the maximum or minimum possible power consumption forecast for each DER that was used to adjust the running total. However, it should be appreciated that in other examples, power output asset type DERs and/or storage asset type DERs may be included in the subset of DERs 130 and corresponding first or second control limit forecasts for such DERs may be added (or subtracted) from the running total 138.

In example embodiments, an opportunity cost may be associated with a DER that corresponds to a cost associated with a dispatch 132 for the DER that influences either an increase or decrease in the power consumption of a load asset (or increase or decrease in power output) for a power output asset or storage asset type of DER. In general, the processor may also select DERs for the subset of DERs that minimize opportunity costs.

It should also be appreciated that the processor may be configured to attempt to avoid repeatedly selecting the same DERs for the subset of DERS. Thus, the opportunity costs associated with a dispatch to a DER may be determined to increase, based on the amount of dispatches that are issued to the DER is a predetermined amount of time. In addition, where opportunity costs are generally the same for DERs, DERs from the plurality of DERs may be selected randomly for inclusion in the subset of DERs Once the required number of dispatches 132 have been determined for the subset of DERs 130, the processor may output the dispatches 132 (via communication with the DER interfaces 140) in order to control the subset of DERs 130 to have an aggregate power load that is closer to meeting the commitment for the reserve capacity request 128 for the time period than when no dispatches are issued to the subset of DERs.

In these described embodiments, the variously determined forecasts, and reserve capacity requests and any other data may be stored in memory and/or persisted to one or more data stores 144 (e.g., databases such as Oracle or Microsoft SQL server), for use by the processor 102 in the various functions described herein and/or for outputting via one or more display devices 108.

It should be appreciated that the forecasts may be determined on a regular interval (e.g., every one or more minutes) for time periods that span one or more days). As the aggregated DERs may be continuously monitored and controlled by the described system, the processor may be configured to continuously output bids and carry out optimization on corresponding time intervals or other time intervals that are sufficient to produce efficient and cost effective management of the DERs in a manner that balances costs for reserve capacity versus opportunity cost associated with influencing DERs to reduce or increase power consumption.

In the examples described herein, the DER forecasts 114, 134, 136 include forecasts for both load asset type DERs 118 as well as power output type DERs 120, and optionally storage asset type DERs 142. However, it should be appreciated that in alternative embodiments the DER forecasts may be with respect to load asset type DERs only, and the determined combined reserve capacity forecasts may be based on such forecasts for load assets type DERs only.

The described examples are operative to use aggregated capacity from a large number of DERs, as multiple manageable flexible load classes to enable executing real time ancillary services capabilities, peak shifting and bid flexibility for day-ahead energy trading as a VPP, while controlling, influencing and monitoring individual DER units.

The system can aggregate loads such as air conditioners, commercial or residential HVAC units, residential baseboards, and commercial lighting systems, with larger discrete loads such as generators, storage units in a single portfolio that can then be subjected to marketing and cost/benefit based optimizations.

Figure 2:
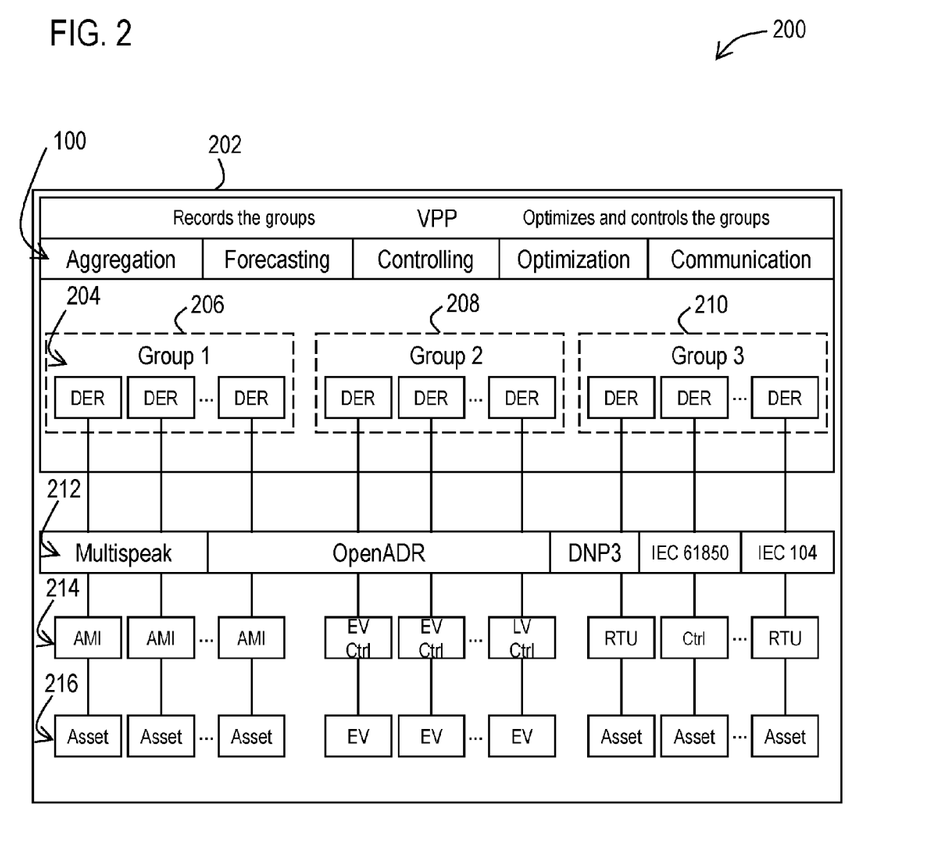
FIG. 2 illustrates an example schematic illustration of a virtual power plant system that employs the system and carries out the methodologies described herein.

FIG. 2 illustrates a functional block diagram 200 of a VPP 202 that uses the described system 100 to carry out the functions of aggregation, forecasting, controlling, optimization, and communication with DERs 204 aggregated into groups of aggregated DERs 206, 208, 210. FIG. 2 further illustrates a plurality of different interfaces 212 for different communication specification/protocols (e.g., Multispeak, OpenADR, DNP3, IEC 104) and controllers 214 by which the underlying assets 216 of the DERs are monitored and controlled.

The system 100 may manage DERs according to aggregation which is based on but not limited to physics of the asset, geographic location, and the power profile associated with the asset. As discussed previously, for each load the system may generate: a forecast of the load profile that cannot be influenced, i.e., power consumption that cannot be influenced; a forecast of the upper control limit, i.e., maximum possible power consumption; and a forecast of the lower control limit, i.e., minimum possible power consumption.

The system allows use of different forecasting algorithms per DER asset identified based on the physics of the asset. For example, the software instructions may produce a graphical user interface (GUI) via which DERs may be identified to belong to a certain power profile, and one of possibly several different forecast algorithms that may be made available for selection via the GUI. The processor, for example, may be configured to receive through operation of the input device 110, inputs corresponding to a selection of the plurality of DERS to include in the aggregated DERs and be grouped in associated with one or more forecasting algorithms. Also, the processor may be configured to receive through operation of the input device 110, inputs corresponding to a selection of a subset of forecasting algorithms from among a plurality of selectable forecasting algorithms 116 presented through the display device 108 that are to be used by the processor to determine the DER forecasts for the selected DERs. It should be appreciated that different forecast algorithms may be selectable for all three types of DER forecasts 114, 134, 136 that are generated for each DER.

The system 100 may (based on the individual DER non-influenced forecasts) generate aggregated power measurement online forecasts (for example, minute-by-minute) for load assets that is used to determine the previously described combined reserve capacity request. The system 100 may also generate (based on the individual DER control limit forecasts): aggregated upper control limit online forecasts (for example, minute-by-minute); and aggregated lower control limit online forecasts (for example, minute-by-minute). Such aggregated forecasts may be used as an input into an online control module of the system as an individual DER class that can be presented to a market system for day-ahead schedule market, peak shifting and ancillary services.

Using these described forecasts (and addition parameters), two optimizations may be executed by the system 100 that include: day-ahead optimization and dispatching; and minute optimization and dispatching. Such optimizations may include the optimization functions described previously. However, it should be appreciated that such optimization functions may vary based on how close they are to the actual time period for which the forecasts are applicable.

For example, for the day-ahead optimization and dispatching, the initial task of optimization may include calculating the sum of reserve capacity for preparation of the bid to a market system. For the bid, the system may use an energy purchase cost that is lower than the opportunity costs associated with dispatches to influence the assets.

The system may be configured to sum the non-influenced forecasts in order to obtain the natural power profile of the aggregated DERs comprised of multiple DERs. This sum corresponds to the reserve capacity of the system that can then be used for the bid to the market system for the aggregated DER.

When the bid is accepted, a dispatch is produced that specifies the reserve capacity request for aggregated DERs. The system 100 may then distribute the power profiles for the aggregated DERs to a subset of DERs selected according to the opportunity costs and forecasted control limits to meet the lowest possible opportunity cost within the limits of the reserve capacity request. If the opportunity cost is equal for the DERS, the subset of DERs selected for dispatches may be chosen randomly.

As discussed previously, the selection of the subset of DERs to send dispatches may involve comparing the dispatch for the reserve capacity request for its scheduled time period with a current/updated aggregated non-influenced forecast for this time period. If the reserve capacity request is less than the aggregated non-influenced forecast for the time period (i.e., the updated reserve capacity forecast for the time period), the system may use the forecasted lower control limit for the DERs for the dispatches. However, if the reserve capacity request is more than the aggregated non-influenced forecast for the time period (i.e., the updated reserve capacity forecast for the time period), the system may use the forecasted upper control limit for the DERs for the dispatches.

In this example, the system may iteratively loop through the DERs to calculate a running total of reserve capacity for the aggregated DERs and prepare a list of DERs (i.e., the subset of DERs) that will receive dispatches to meet the reserve capacity request for the time period. For each loop, a different DER may be processed in which the processor recalculates the running total of power that is requested in that time period by updating the running total with an upper or lower control limit power level for the respective DER.

For example, for a load asset type of DER, for negative reserve capacity (i.e., the updated reserve capacity forecast is higher that the requested reserve capacity) the running total may be updated to use the lower control limit forecast for the DER. Also, for a positive reserve capacity (i.e., the updated reserve capacity forecast is lower that the requested reserve capacity) the running total may be updated to use the higher control limit forecast for the DER.

After each iterative loop, the system may check if the running total meets the requested reserve capacity target, else the iterative process continues until the target is met. Once the target is met, DERs on the list are issued dispatches for the time period with the corresponding real power value (kW) from its control limit forecast that was used to update the running total. It should be noted that this determined list of DERs to which dispatches are set may typically include less than the total number of the aggregated DERs.

In example embodiments, minute optimization and dispatching may be carried out on a minute cycle that is suitable for performing ancillary services. Minute optimization and dispatching may use one or more of the following optimization parameters to determine updated dispatches for the aggregated DERs: first control limit power forecast (e.g., maximum possible power consumption forecast), current power consumption, non-influenced power profile forecast, second control limit forecast (e.g., minimum possible power consumption forecast), opportunity cost for control of DERs—when increasing load, opportunity cost for control—when decreasing load, and/or on/off status of the DER asset.

In this optimization example, each cycle measured values per aggregation instance is combined with other DER assets in the system, and the updated reserve capacity forecast is calculated. Reaching the receive capacity request target, for example, may be implemented using DERs having the lower opportunity costs on the basis of the control direction, with dispatches happening as fast as possible.

If the opportunity costs are identical, the dispatches for control deviation may be distributed to the subset of DERs chosen proportionally to the DER's remaining control capacity up to the corresponding maximum bound for controlling the DER. Choosing subsets of DERs to control in this manner for different time periods may enable the system to achieving maintaining the maximum possible control rate of DERs over time.

In example embodiments, the described system may control a particular DER in order to reach the calculated control setting (e.g., power consumption for load assets) based on a set point value for the aggregated DERs (e.g., load class), if the control active status is ON for the DER. If the control active status is set to OFF for the DER, the system 100 may not include the DER in the subset of DERS to receive dispatches, but the current measured power level for the DER may still be included in the running total for the minute optimization.

In the minute optimization, based on a set point (e.g., a power level) for the aggregated load control for the aggregated DER (to meet the reserve capacity request), individual DERs may be dispatched as follows:

If the control status flag for a DER is OFF, the system cancels any existing dispatches for the DER (e.g., existing dispatches issued during the day-ahead optimization and/or prior minute optimizations). If the control status flag for the DER is ON, the system calculates the individual set point dispatches for DER. The system may then interactively loop through each DER of the aggregated DERs. For each cycle in the loop, the system may calculate non-influenced power profile forecast for the DER in real time using the latest power consumption data received for the DER. This latest power consumption may be added to the running total to meet the aggregated set point. Once a sufficient number of DERs to control have achieved a running total that meets or exceed the aggregated set point for the aggregated DERs, the system may dispatch the subset of DERS using the set points corresponding to the determined control limits for the DERs.

In this example, when dispatching DERs, the system may check to ensure that the DER is not already executing a previous set point. If a DER is part of a running dispatch, the set point is altered by reissuing the dispatch. If the DER is not currently in a dispatch, then the dispatch is issued in real time.

Figure 3:
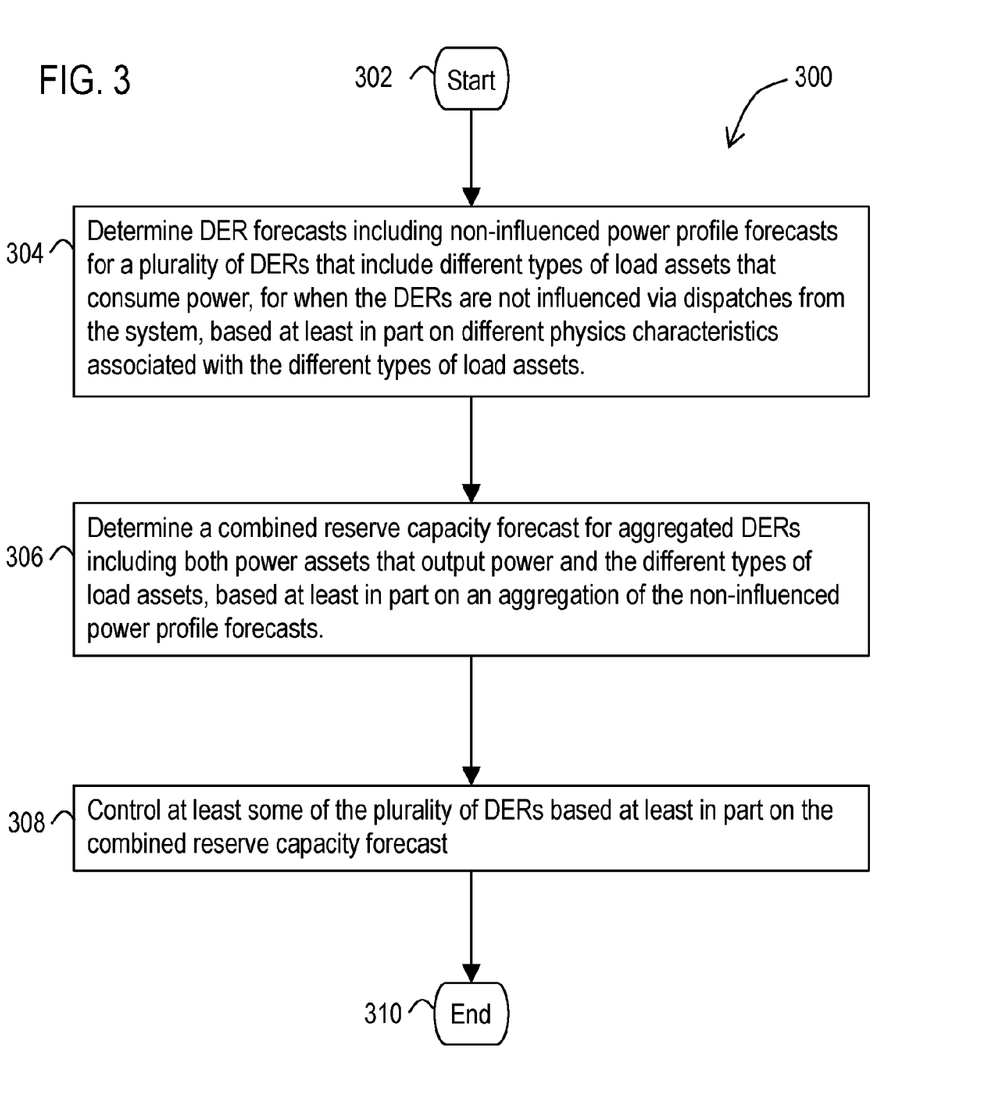
FIG. 3 illustrates a flow diagram of an example methodology that facilitates aggregation of a plurality of DERs.

With reference now to FIG. 3, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 3, a methodology 300 is illustrated that facilitates aggregation of a plurality of controllable distributed energy resources. The methodology may start at 302 and may include several acts carried out through operation of at least one processor. These acts may include an act 304 of determining DER forecasts including non-influenced power profile forecasts for a plurality of DERs that include different types of load assets that consume power, for when the DERs are not influenced via dispatches from the system, based at least in part on different physics characteristics associated with the different types of load assets. These acts may also include an act 306 of determining a combined reserve capacity forecast for aggregated DERs including both power assets that output power and the different types of load assets, based at least in part on an aggregation of the non-influenced power profile forecasts. In addition these acts may include an act 308 of controlling at least some of the plurality of DERs based at least in part on the combined reserve capacity forecast. At 310 the methodology may end.

Figure 4:
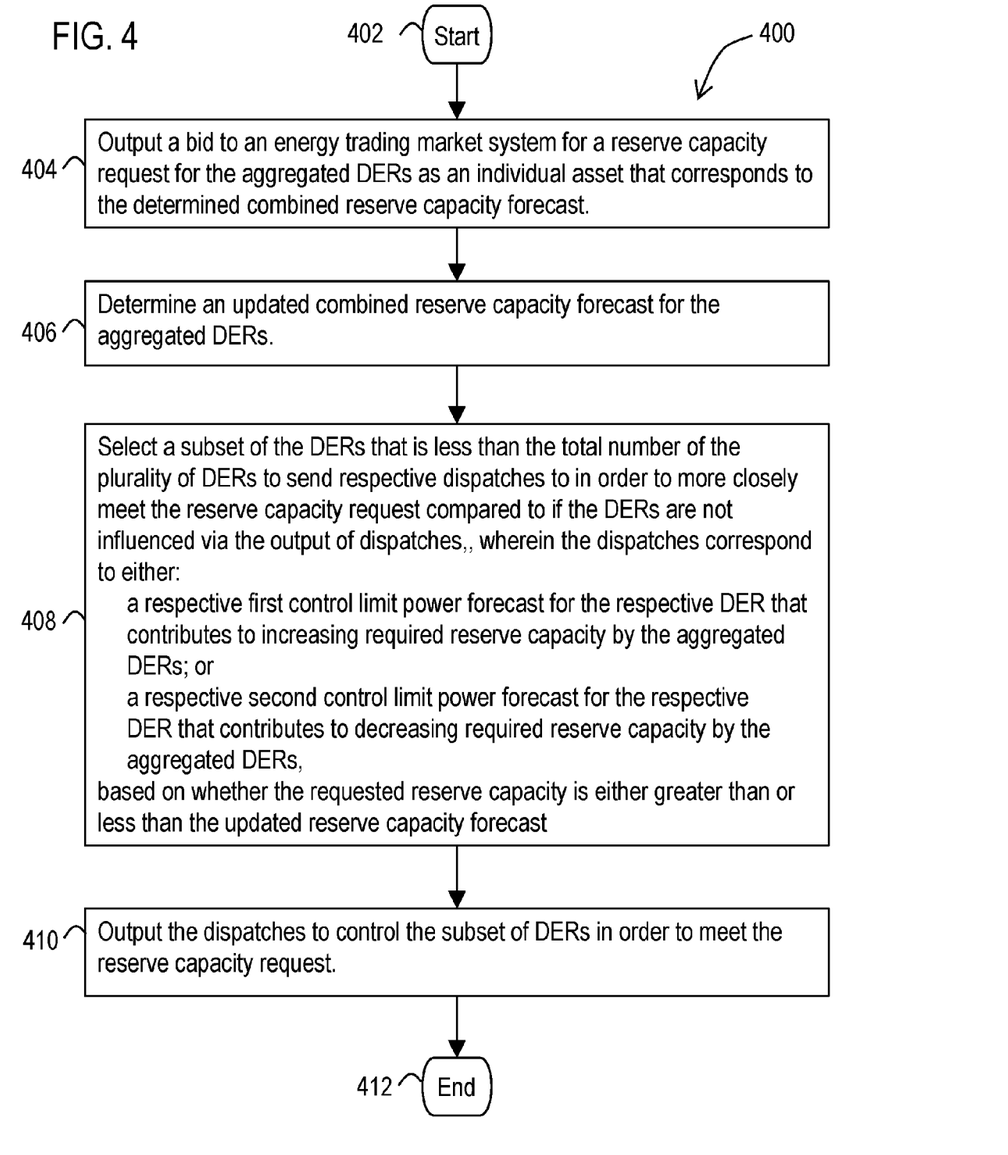
FIG. 4 illustrates a flow diagram of an example methodology that facilitates optimization of the aggregated DERs.

In addition referring now to FIG. 4, a subsequent methodology 400 is illustrated that facilitates optimization of the operation of the aggregated DERs that may be carried out by controlling step 308 in FIG. 3. The methodology 400 may start at 402 and may include several acts carried out through operation of at least one processor. These acts may include an act 404 of outputting a bid to an energy trading market system for a reserve capacity request for the aggregated DERs as an individual asset that corresponds to the determined combined reserve capacity forecast. Also these acts may include an act 406 of determining an updated combined reserve capacity forecast for the aggregated DERs. Further, these acts may also include an act 408 of selecting a subset of the DERs that is less than the total number of the plurality of DERs to send respective dispatches in order to more closely meet the reserve capacity request compared to if the DERs are not influenced via the output of dispatches. Here the dispatches correspond to either: a respective first control limit power forecast for the respective DER that contributes to increasing required reserve capacity by the aggregated DERs; or a respective second control limit power forecast for the respective DER that contributes to decreasing required reserve capacity by the aggregated DERs, based on whether the requested reserve capacity is either greater than or less than the updated reserve capacity forecast. In addition, these acts may include an act 410 of outputting the dispatches to control the subset of DERs in order to meet the reserve capacity request. At 412 the methodology may end.

It should be appreciated that these methodologies 300, 400 may include other acts and features discussed previously with respect to the data processing system 100. For example, these methodology may include an act of receiving inputs through at least one input device corresponding to: a selection of the plurality of DERS to include in the aggregated DERs; and a selection of a subset of forecasting algorithms from among a plurality of selectable forecasting algorithms presented through a display device to use by the processor to determine the DER forecasts.

In addition, the methodologies may include repeatedly determining the DER forecasts for each DER, which DER forecasts include the non-influenced power profile forecasts, the first control limit power forecast, and the second control limit power forecast. In this example, the first control limit power forecast for the respective DER that contributes to increasing required reserve capacity by the aggregated DERs may corresponds to a maximum possible power consumption forecast by a respective load asset. Also in this example, the second control limit power forecast for the respective DER that contributes to decreasing required reserve capacity by the aggregated DERs corresponds to a minimum possible power consumption forecast by a respective load asset.

The methodologies may further include an act of calculating a running total of power consumption. In this example, when the reserve capacity request is greater than the updated combined reserve capacity forecast, the methodology may include incrementally cycling through at least a portion of the plurality of DERs included in the aggregated DERs to adjust the calculated running total to reflect power consumption using a maximum possible power consumption forecast for each respective DER, until the running total corresponds to the reserve capacity request. Also in this example, when the reserve capacity request is less than the updated combined reserve capacity forecast, the methodology may include incrementally cycling through at least a portion of the plurality of DERs included in the aggregated DERs to adjust the calculated running total to reflect power consumption using a minimum possible power consumption forecast for each respective DER, until the running total corresponds to the reserve capacity request. In this described example, the subset of DERs corresponds to the DERs for which a maximum or a minimum possible power consumption forecast was used to adjust the running total. Also in this example, the dispatches for the subset of DERs specify either the maximum or the minimum possible power consumption forecast that was used to adjust the running total.

The described methodologies may also include an act of selecting DERs to include in the subset of DERS based on opportunity costs associated with the DERs, wherein an opportunity cost associated with a DER corresponds to a cost associated with a dispatch for the DER that influences either an increase or decrease in the power consumption of a load asset for the DER. In addition, as discussed previously, load assets may include at least one of an air conditioner, an HVAC, baseboard heater, building lighting system, or any combination thereof. Also, as discussed previously, power output assets may include at least one solar power panel, wind turbine, generator, or any combination thereof.

As discussed previously, acts associated with these methodologies (other than any described manual acts) may be carried out by one or more processors. Such processor(s) may be included in one or more data processing systems, for example, that execute software components (including software instructions) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software code/environments/languages/frameworks such as machine code, assembly language, Java, JavaScript, Python, C, C#, C++ or any other software tool capable of producing software components and user interfaces configured to carry out the acts and features described herein.

Figure 5:
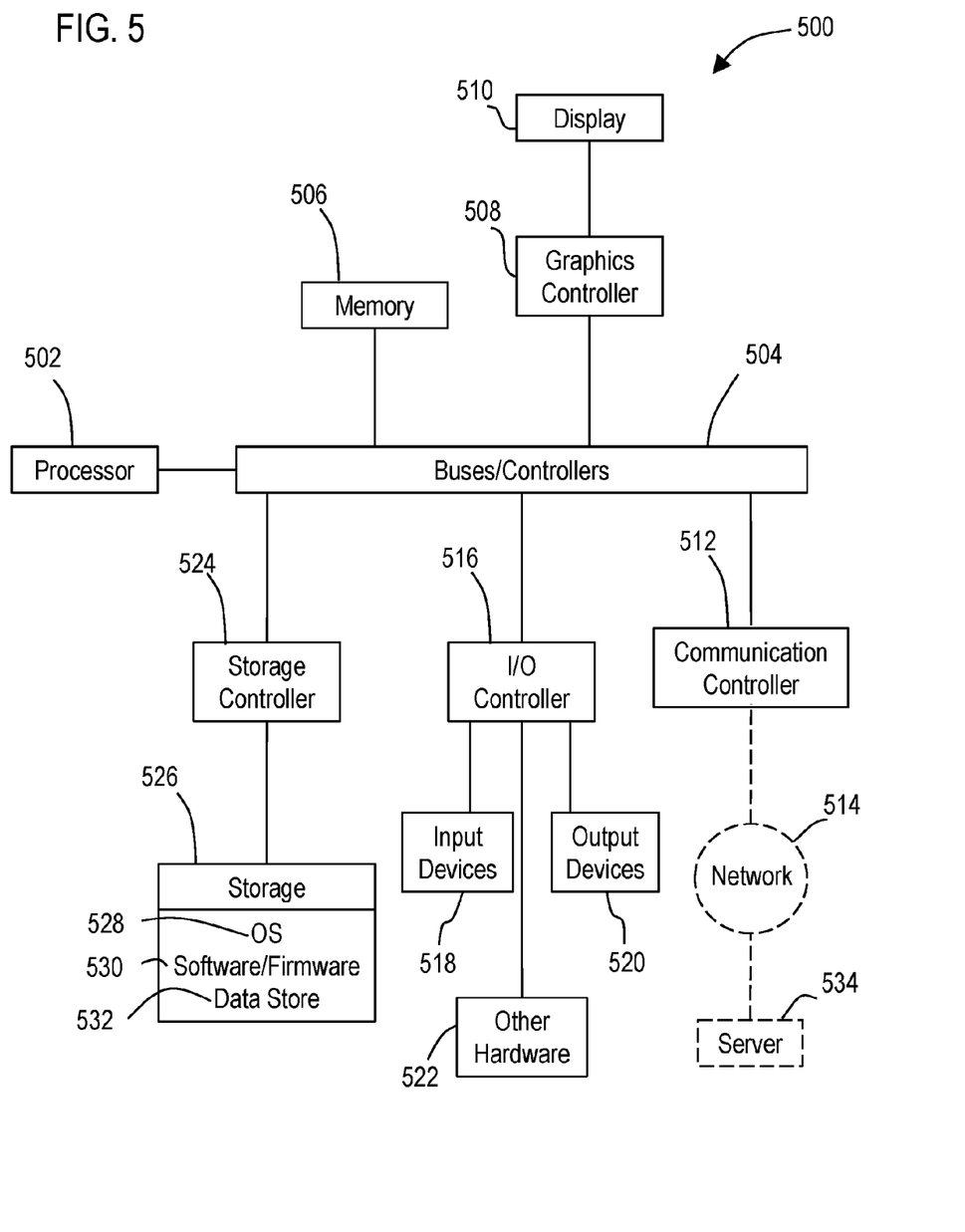
FIG. 5 illustrates a block diagram of a data processing system in which an embodiment may be implemented.

FIG. 5 illustrates a block diagram of a data processing system 500 (e.g., a computer system) in which an embodiment can be implemented, for example, as a portion of a energy management system, and/or other system operatively configured by software or otherwise to perform the functions and processes as described herein. The data processing system depicted includes at least one processor 502 (e.g., a CPU) that may be connected to one or more bridges/controllers/buses 504 (e.g., a north bridge, a south bridge). One of the buses 504, for example, may include one or more I/O buses such as a PCI Express bus. Also connected to various buses in the depicted example may include a main memory 506 (RAM) and a graphics controller 508. The graphics controller 508 may be connected to one or more display devices 510. It should also be noted that the processor 502 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 512 (Ethernet controllers, WiFi controllers, cellular controllers) operative to connect to a local area network (LAN), Wide Area Network (WAN), a cellular network, and/or other wired or wireless networks 514 or communication equipment.

Further components connected to various busses may include one or more I/O controllers 516 such as USB controllers, Bluetooth controllers, and/or dedicated audio controllers (connected to speakers and/or microphones). It should also be appreciated that various peripherals may be connected to the I/O controller(s) (via various ports and connections) including input devices 518 (e.g., keyboard, mouse, pointer, touch screen, touch pad, drawing tablet, trackball, buttons, keypad, game controller, gamepad, camera, microphone, scanners, motion sensing devices that capture motion gestures), output devices 520 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 502 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 522 connected to the I/O controllers 516 may include any type of device, machine, or component that is configured to communicate with a data processing system.

Additional components connected to various busses may include one or more storage controllers 524 (e.g., SATA). A storage controller may be connected to a storage device 526 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 504 such as a PCI Express bus.

A data processing system in accordance with an embodiment of the present disclosure may include an operating system 528, software/firmware 530, and data stores 532 (that may be stored on a storage device 526 and/or the memory 506). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 512 may be connected to the network 514 (which may or may not be a part of a data processing system 500), which can be any local, wide area, remote, private, and/or public data processing system network or combination of networks, as known to those of skill in the art, including the Internet. Data processing system 500 can communicate over the network 514 with one or more other data processing systems such as a server 534 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 502 and associated components may correspond to the combination of one or more virtual machine processors operating in a physical data processing system such as one or more physical servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 500 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device. Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

Also, at least one processor that is "configured to" carry out one or more functions or processes is defined herein as the combination of the at least one processor and the particular software/firmware instructions and/or wired circuits that when executed/operated by the at least one processor cause the at least one processor to carry out the one or more functions or processes described or recited herein. A processor that is configured to carry out a particular function/process may correspond to the combination of the processor and the software/firmware instructions in which the processor is actively executing at least portions of the software/firmware instructions that are loaded into a volatile memory (e.g., RAM, CPU cache) and that are programmed to cause the processor to carry out the described or recited function/process. In addition, a processor that is configured to carry out a particular function/process may correspond to the combination of the processor and the software/firmware instructions in which the software/firmware instructions are stored in a non-volatile memory or storage device (e.g., flash memory, SSD, hard drive) in operative connection with the processor such that the software/firmware instructions are available to be executed by the processor to carry out the described function/process (even though none, or only portions of the software/firmware instructions are currently being executed by the processor).

For example, a processor that is configured in the manner described or recited herein may include a processor that is in an off, sleep, or hibernation state (or is executing other processes), but still has software/firmware instructions (capable of causing the processor to carry out the functions described/recited herein for which it is configured) presently installed on a non-volatile memory or storage device in operative connection with the processor (in a data processing system) that enables the software/firmware instructions to be accessed and executed in response to receipt of one or more manual, internal, and/or external inputs/events/signals when the processor is running.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 500 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for aggregation of a plurality of controllable distributed energy resources (DERs) comprising:
at least one processor configured to:
determine DER forecasts including non-influenced power profile forecasts for a plurality of DERs that include different types of load assets that consume power, for when the plurality of DERs are not influenced via dispatches from the system, based at least in part on different physics characteristics associated with the different types of the load assets;
determine a combined reserve capacity forecast for aggregated DERs including both power assets that output power and the different types of load assets, based at least in part on an aggregation of the non-influenced power profile forecasts;
control at least some of the plurality of DERs based at least in part on the combined reserve capacity forecast;
output a bid to an energy trading market system for a reserve capacity request for the aggregated DERs as an individual asset that corresponds to the determined combined reserve capacity forecast;
determine an updated combined reserve capacity forecast for the aggregated DERs;
select a subset of the plurality of DERs that is less than a total number of the plurality of DERs to send respective dispatches in order to more closely meet the reserve capacity request compared to if the plurality of DERs are not influenced via an output of dispatches, wherein the dispatches correspond to either:
a respective first control limit power forecast for a respective DER that contributes to increasing required reserve capacity by the aggregated DERs; or
a respective second control limit power forecast for the respective DER that contributes to decreasing required reserve capacity by the aggregated DERs, based on whether the reserve capacity request is either greater than or less than the updated reserve capacity forecast; and
control a power output and power consumption of the subset of DERs with output of the dispatches in order to meet the reserve capacity request.

2. The system according to claim 1, wherein the at least one processor is configured to receive inputs through at least one input device corresponding to: a selection of the plurality of DERS to include in the aggregated DERs; and a selection of a subset of forecasting algorithms from among a plurality of selectable forecasting algorithms presented through a display device to use by the processor to determine the DER forecasts.

3. The system according to claim 2, wherein the at least one processor is configured to -repeatedly determine the DER forecasts for each DER, which DER forecasts include the non-influenced power profile forecasts, the respective first control limit power forecast, and the respective second control limit power forecast,
wherein the respective first control limit power forecast for the respective DER that contributes to increasing required reserve capacity by the aggregated DERs corresponds to a maximum possible power consumption forecast by a respective load asset; and
wherein the respective second control limit power forecast for the respective DER that contributes to decreasing required reserve capacity by the aggregated DERs corresponds to a minimum possible power consumption forecast by a respective load asset.

4. The system according to claim 3, wherein the at least one processor is further configured to:
calculate a running total of power consumption, wherein when the reserve capacity request is:
greater than the updated combined reserve capacity forecast, incrementally cycle through at least a portion of the plurality of DERs included in the aggregated DERs to adjust the running total of power consumption to reflect power consumption using a maximum possible power consumption forecast for each respective DER, until the running total of power consumption corresponds to the reserve capacity request; or
less than the updated combined reserve capacity forecast, incrementally cycle through at least a portion of the plurality of DERs included in the aggregated DERs to adjust the running total of power consumption to reflect power consumption using a minimum possible power consumption forecast for each respective DER, until the running total of power consumption corresponds to the reserve capacity request,
wherein the subset of DERs corresponds to the plurality of DERs for which a maximum or a minimum possible power consumption forecast was used to adjust the running total,
wherein the dispatches for the subset of DERs specify either the maximum or the minimum possible power consumption forecast that was used to adjust the running total.

5. The system according to claim 4, wherein the at least one processor is configured to select the plurality of DERs to include in the subset of DERS based on opportunity costs associated with the plurality of DERs, wherein an opportunity cost associated with a DER corresponds to a cost associated with a dispatch for the DER that influences either an increase or decrease in a power consumption of a load asset for the DER.

6. The system according to claim 5, wherein the load assets include at least one of an air conditioner, an HVAC, baseboard heater, building lighting system, or any combination thereof, wherein the power assets include at least one solar power panel, wind turbine, generator, or any combination thereof.

7. A method for aggregation of a plurality of controllable distributed energy resources (DERs) comprising:
through operation of at least one processor:
determining DER forecasts including non-influenced power profile forecasts for a plurality of DERs that include different types of load assets that consume power, for when the plurality of DERs are not influenced via dispatches from a system, based at least in part on different physics characteristics associated with the different types of load assets;
determining a combined reserve capacity forecast for aggregated DERs including both power assets that output power and the different types of load assets, based at least in part on an aggregation of the non-influenced power profile forecasts;
controlling at least some of the plurality of DERs based at least in part on the combined reserve capacity forecast;
outputting a bid to an energy trading market system for a reserve capacity request for the aggregated DERs as an individual asset that corresponds to the determined combined reserve capacity forecast;

determining an updated combined reserve capacity forecast for the aggregated DERs;

selecting a subset of the plurality of DERs that is less than a total number of the plurality of DERs to send respective dispatches in order to more closely meet the reserve capacity request compared to if the plurality of DERs are not influenced via an output of dispatches, wherein the dispatches correspond to either:

a respective first control limit power forecast for a respective DER that contributes to increasing required reserve capacity by the aggregated DERs; or a respective second control limit power forecast for the respective DER that contributes to decreasing required reserve capacity by the aggregated DERs, based on whether the reserve capacity request is either greater than or less than the updated reserve capacity forecast; and controlling a power output and power consumption of the subset of DERs with output of the dispatches in order to meet the reserve capacity request.

8. The method according to claim 7, further comprising through operation of the at least one processor, receiving inputs through at least one input device corresponding to: a selection of the plurality of DERS to include in the aggregated DERs; and a selection of a subset of forecasting algorithms from among a plurality of selectable forecasting algorithms presented through a display device to use by the processor to determine the DER forecasts.

9. The method according to claim 8, further comprising through operation of the at least one processor:

repeatedly determining the DER forecasts for each DER, which DER forecasts include the non-influenced power profile forecasts, the first control limit power forecast, and the second control limit power forecast, wherein the respective first control limit power forecast for the respective DER that contributes to increasing required reserve capacity by the aggregated DERs corresponds to a maximum possible power consumption forecast by a respective load asset; and wherein the respective second control limit power forecast for the respective DER that contributes to decreasing required reserve capacity by the aggregated DERs corresponds to a minimum possible power consumption forecast by a respective load asset.

10. The method according to claim 9, wherein the at least one processor is further configured to:

calculating a running total of power consumption, wherein when the reserve capacity request is:

greater than the updated combined reserve capacity forecast, incrementally cycling through at least a portion of the plurality of DERs included in the aggregated DERs to adjust the running total of power consumption to reflect power consumption using a maximum possible power consumption forecast for each respective DER, until the running total of power consumption corresponds to the reserve capacity request; or less than the updated combined reserve capacity forecast, incrementally cycling through at least a portion of the plurality of DERs included in the aggregated DERs to adjust the calculated running total to reflect power consumption using a minimum possible power consumption forecast for each respective DER, until the running total of power consumption corresponds to the reserve capacity request, wherein the subset of DERs corresponds to the plurality of DERs for which a maximum or a minimum possible power consumption forecast was used to adjust the running total of power consumption, wherein the dispatches for the subset of DERs specify either the maximum or the minimum possible power consumption forecast that was used to adjust the running total of power consumption.

11. The method according to claim 10, further comprising through operation of the at least one processor:

selecting DERs to include in the subset of DERS based on opportunity costs associated with the plurality of DERs, wherein an opportunity cost associated with a DER corresponds to a cost associated with a dispatch for the DER that influences either an increase or decrease in a power consumption of a load asset for the DER.

12. The method according to claim 11, wherein the load assets include at least one of an air conditioner, an HVAC, baseboard heater, building lighting system, or any combination thereof, wherein the power assets include at least one solar power panel, wind turbine, generator, or any combination thereof.

13. A non-transitory computer readable medium encoded with executable instructions that when executed, cause at least one processor to carry out a method comprising:

determining DER forecasts including non-influenced power profile forecasts for a plurality of DERs that include different types of load assets that consume power, for when the plurality of DERs are not influenced via dispatches from a system, based at least in part on different physics characteristics associated with the different types of load assets;

determining a combined reserve capacity forecast for aggregated DERs including both power assets that output power and the different types of load assets, based at least in part on an aggregation of the non-influenced power profile forecasts;

controlling at least some of the plurality of DERs based at least in part on the combined reserve capacity forecast;

outputting a bid to an energy trading market system for a reserve capacity request for the aggregated DERs as an individual asset that corresponds to the determined combined reserve capacity forecast;

determining an updated combined reserve capacity forecast for the aggregated DERs;

selecting a subset of the plurality of DERs that is less than a total number of the plurality of DERs to send respective dispatches in order to more closely meet the reserve capacity request compared to if the plurality of DERs are not influenced via an output of dispatches, wherein the dispatches correspond to either:

a respective first control limit power forecast for a respective DER that contributes to increasing required reserve capacity by the aggregated DERs; or a respective second control limit power forecast for the respective DER that contributes to decreasing required reserve capacity by the aggregated DERs, based on whether the reserve capacity request is either greater than or less than the updated reserve capacity forecast; and controlling a power output and power consumption of the subset of DERs with output of the dispatches in order to meet the reserve capacity request.

14. The non-transitory computer readable medium according to claim 13, further comprising receiving inputs through at least one input device corresponding to: a selection of the plurality of DERS to include in the aggregated DERs; and a selection of a subset of forecasting algorithms from among a plurality of selectable forecasting algorithms presented through a display device to use by the processor to determine the DER forecasts.

15. The non-transitory computer readable medium according to claim 14, further comprising:
repeatedly determining the DER forecasts for each DER, which DER forecasts include the non-influenced power profile forecasts, the first control limit power forecast, and the second control limit power forecast,
wherein the respective first control limit power forecast for the respective DER that contributes to increasing required reserve capacity by the aggregated DERs corresponds to a maximum possible power consumption forecast by a respective load asset; and
wherein the respective second control limit power forecast for the respective DER that contributes to decreasing required reserve capacity by the aggregated DERs corresponds to a minimum possible power consumption forecast by a respective load asset.

16. The non-transitory computer readable medium according to claim 15, further comprising:
calculating a running total of power consumption, wherein when the reserve capacity request is:
greater than the updated combined reserve capacity forecast, incrementally cycling through at least a portion of the plurality of DERs included in the aggregated DERs to adjust the running total of power consumption to reflect power consumption using a maximum possible power consumption forecast for each respective DER, until the running total corresponds to the reserve capacity request; or
less than the updated combined reserve capacity forecast, incrementally cycling through at least a portion of the plurality of DERs included in the aggregated DERs to adjust the running total of power consumption to reflect power consumption using a minimum possible power consumption forecast for each respective DER, until the running total of power consumption corresponds to the reserve capacity request,
wherein the subset of DERs corresponds to the plurality of DERs for which a maximum or a minimum possible power consumption forecast was used to adjust the running total of power consumption,
wherein the dispatches for the subset of DERs specify either the maximum or the minimum possible power consumption forecast that was used to adjust the running total of power consumption.

17. The non-transitory computer readable medium according to claim 16, further comprising:
selecting DERs to include in the subset of DERS based on opportunity costs associated with the plurality of DERs, wherein an opportunity cost associated with a DER corresponds to a cost associated with a dispatch for the DER that influences either an increase or decrease in a power consumption of a load asset for the DER.

* * * * *